United States Patent [19]

Marzullo

[11] Patent Number: 4,570,757
[45] Date of Patent: Feb. 18, 1986

[54] DEVICE FOR LOCKING A SLIDABLE MEMBER

[75] Inventor: Joseph H. Marzullo, Danbury, Conn.

[73] Assignee: Pitney Bowes Inc., Stamford, Conn.

[21] Appl. No.: 643,992

[22] Filed: Aug. 24, 1984

[51] Int. Cl.$^4$ ............................................. B65H 59/10
[52] U.S. Cl. ....................................... 188/67; 24/525;
74/110; 74/531; 269/234; D8/72; 271/171
[58] Field of Search ................. 188/67, 65.1; 269/234,
269/250, 251; 74/110, 531; 271/171, 223, 224,
250, 253, 254, 255; D8/72, 74; 24/136 B, 524,
525, 526, 569

[56] References Cited

U.S. PATENT DOCUMENTS

| 99,133 | 1/1870 | Barth | 271/171 |
|---|---|---|---|
| 685,394 | 10/1901 | Crafts | 188/67 X |
| 889,768 | 6/1908 | De Leeuw | 24/524 X |
| 1,944,603 | 1/1934 | Hecker | 188/65.1 |
| 3,051,474 | 8/1962 | Helda et al. | 269/234 |

Primary Examiner—George E. A. Halvosa
Attorney, Agent, or Firm—Lawrence E. Sklar; William D. Soltow, Jr.; Albert W. Scribner

[57] ABSTRACT

A device for locking a slidable member, including a U-shaped bracket having a central section and a pair of legs extending upwardly from each end of the central section, each of the legs having upper and lower apertures, a lockable sliding member slidably mounted in the lower apertures, and a threaded spindle rotatably mounted in the upper apertures. The spindle includes a large diameter portion and a small diameter portion, the small diameter portion having a central threaded section for threaded engagement with one of the upper apertures and unthreaded end portions, the large diameter portion having a knob at its exterior end. The device further includes a yoke mounted on the spindle adjacent the large diameter portion, the yoke having a pair of camming posts extending outwardly therefrom perpendicular to the axis of the threaded spindle, and a U-shaped cam follower member situated between the legs of the U-shaped bracket. The cam follower member has a median section contiguous with the lockable, sliding member and a pair of flanges extending upwardly from the median section, each of the flanges having a camming surface inclined downwardly in the direction of the spindle for camming engagement with the camming posts, wherein rotation of the knob in one direction causes the camming posts to be moved in a direction away from the knob to thereby create pressure on the adjacent elements to lock the sliding member against any movement.

3 Claims, 6 Drawing Figures

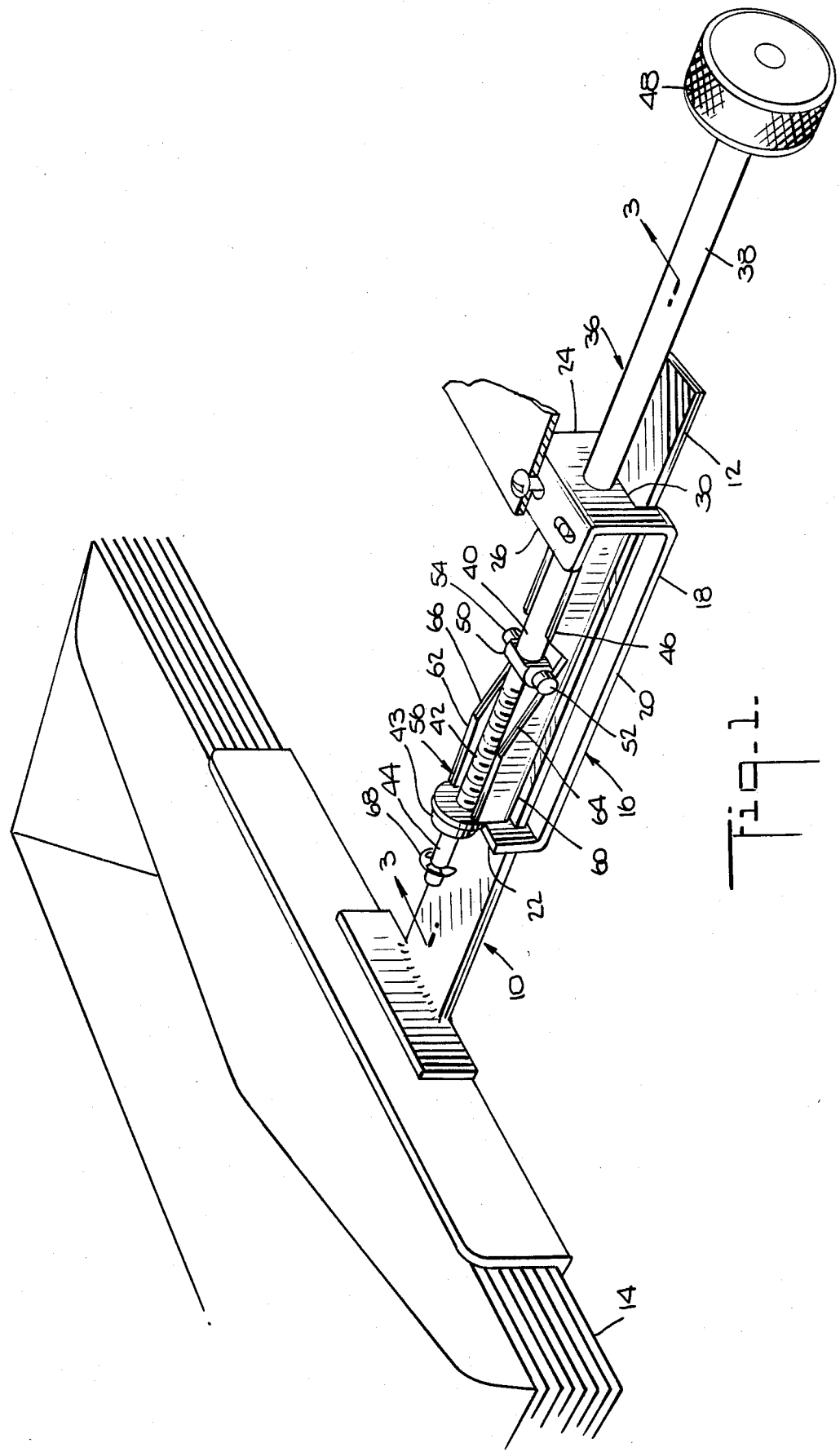

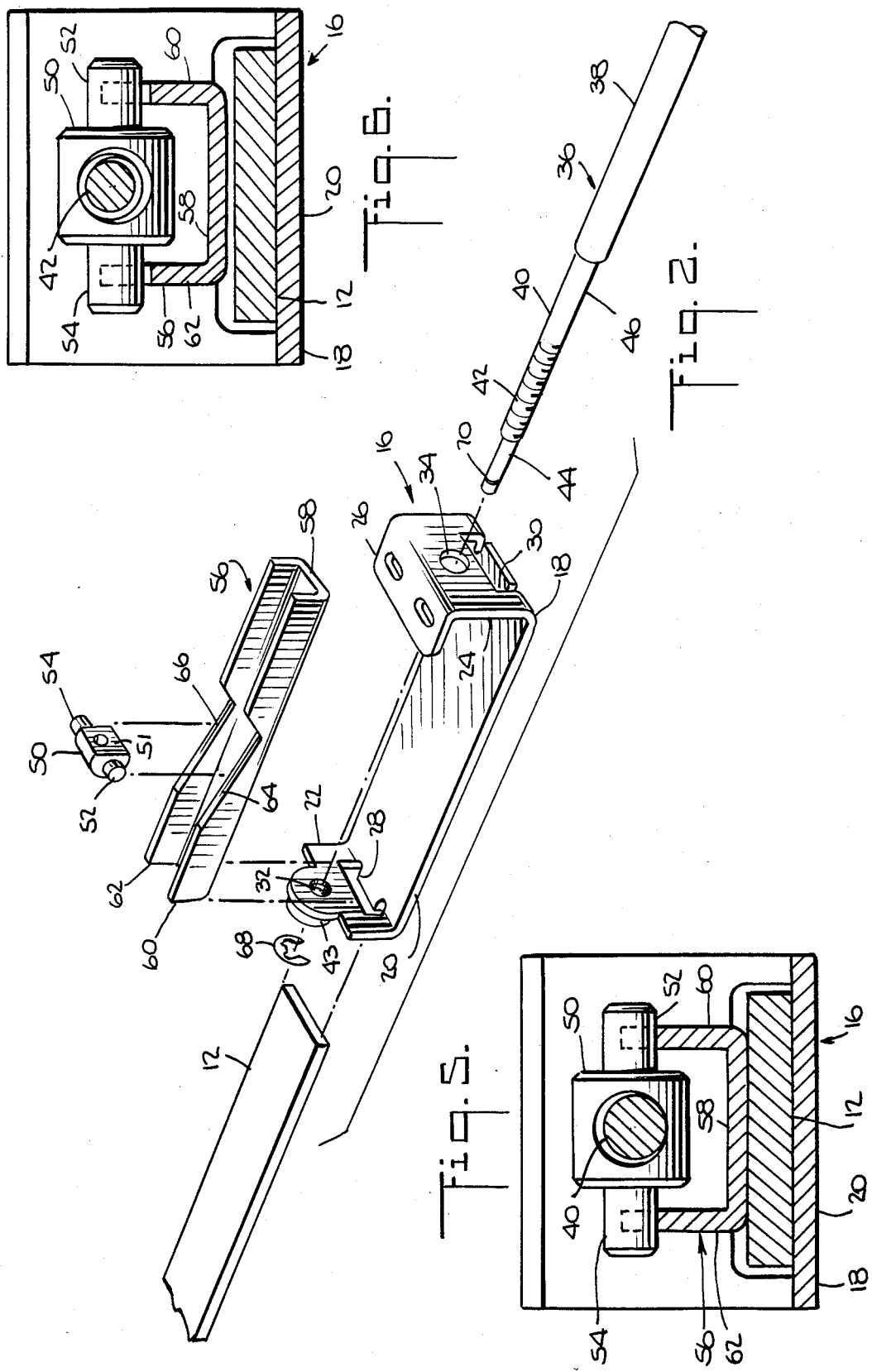

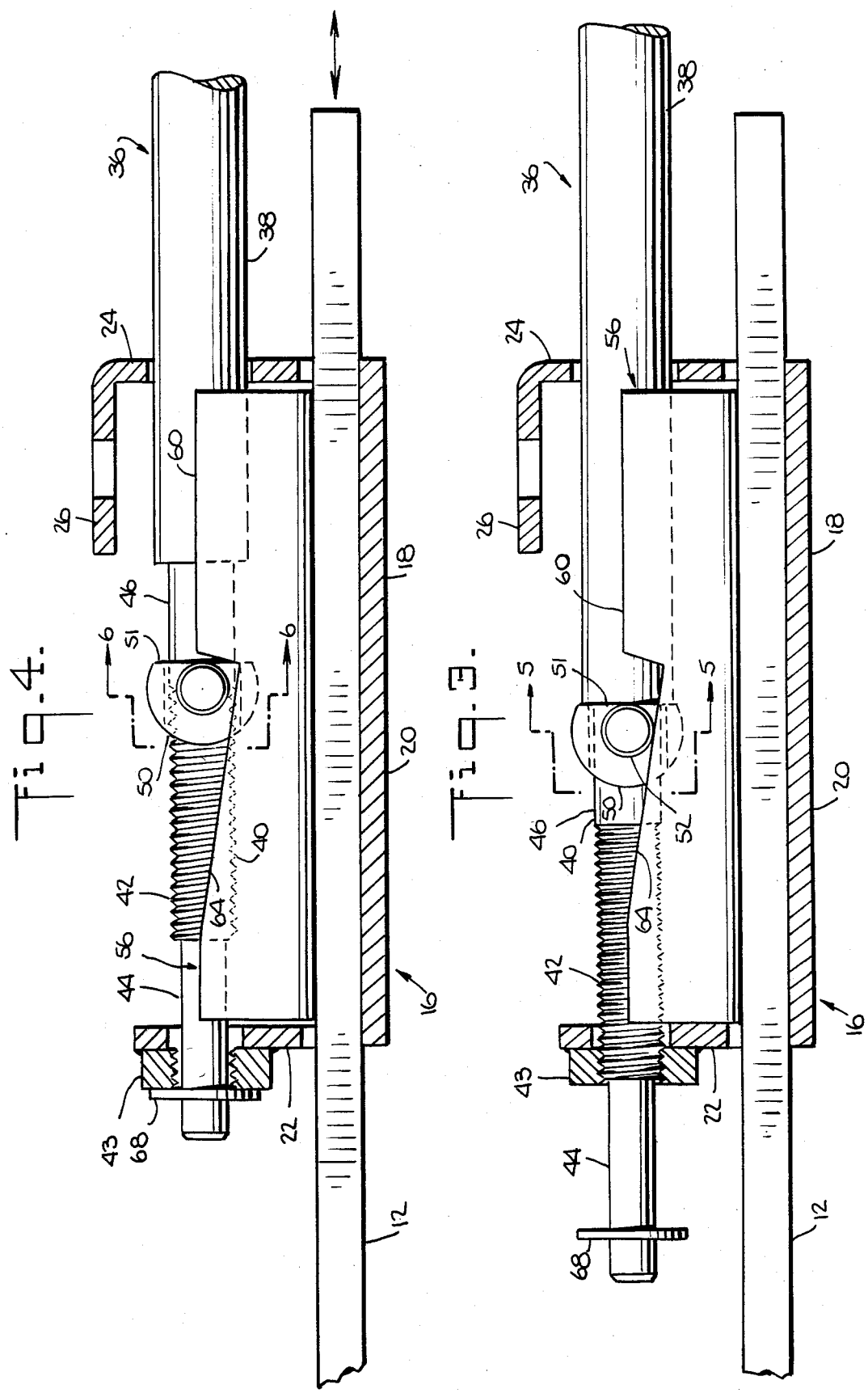

DEVICE FOR LOCKING A SLIDABLE MEMBER

BACKGROUND OF THE INSTANT INVENTION

The instant invention relates to a device for locking a slidable member, and more particularly to such a device to be used in machines having vibrations which tend to loosen conventional locking mechanisms.

Many machines employ adjustable, sliding members which require their being locked into a fixed position, such as mailing machines which have adjustable envelope guides which are locked into various positions depending on the size of the envelopes being fed through the machine. The machines generate certain vibrations which tend to and do in fact loosen conventional locks such as those using eccentrics which secure the adjustable sliding members in their fixed positions.

Accordingly, the instant invention provides a device for locking a slidable member which is very simple to operate and which will not vibrate loose with machine operation.

SUMMARY OF THE INVENTION

The device provided for locking a slidable member includes a U-shaped bracket having a central section and a pair of legs extending upwardly from each end of the central section, each of the legs having a lower aperture adjacent the central section and an upper, circular aperture spaced from the lower aperture, a lockable sliding member slidably mounted in the lower apertures, and a threaded spindle rotatably mounted in the circular apertures, the spindle having a large diameter portion and a small diameter portion, the small diameter portion having a central threaded section for threaded engagement with one of the circular apertures and unthreaded end portions, the large diameter portion having a knob at its exterior end. The device further includes a yoke rotatably mounted on the unthreaded portion of the threaded spindle adjacent the large diameter portion, the yoke having a pair of camming posts extending outwardly therefrom perpendicular to the axis of the threaded spindle, and a U-shaped cam follower member situated between the legs of the U-shaped bracket. The cam follower member has a median section contiguous with the lockable, sliding member and a pair of flanges extending upwardly from the median section, each of the flanges having a camming surface inclined downwardly in the direction of the spindle for camming engagement with said camming posts, wherein rotation of the knob in one direction causes the camming posts to be moved in a direction away from the knob to thereby create downward pressure on the cam follower member and the sliding member against the median section and to lock the sliding member against any movement.

BRIEF DESCRIPTION OF THE DRAWINGS

FIG. 1 is a perspective view of a locking mechanism in the locked position in accordance with the instant invention;

FIG. 2 is an exploded, perspective view of the locking mechanism seen in FIG. 1;

FIG. 3 is a sectional view taken on the horizontal plane indicated by the line 3—3 in FIG. 1;

FIG. 4 is similar to FIG. 3 but it shows the locking mechanism in its unlocked position;

FIG. 5 is a sectional view taken on the vertical plane indicated by the line 5—5 in FIG. 3;

FIG. 6 is a sectional view taken on the vertical plane indicated by the line 6—6 in FIG. 4.

DETAILED DESCRIPTION

In describing the preferred embodiment of the instant invention, reference is made to the drawings wherein there is seen an envelope guide generally designated 10 (see FIG. 1) having a slidable bar 12. The envelope guide 10 is used in a mailing machine (not shown) which prints the proper amount of postage on each envelope. The slidable bar 12 is adjustable and can be locked in any position by virtue of its being seated in a locking device generally designated 16, which includes a U-shaped bracket 18 having a central section 20 and a pair of legs 22 and 24 extending upwardly from each end of the central section 20. The leg 24 includes a flange 26 extending perpendicular therefrom for securing the locking device 16 to the mailing machine.

As best seen in FIG. 2, each of the legs 22 and 24 includes a lower aperture 28 and 30 respectively adjacent the central section 20 of the U-shaped bracket 18. Each leg 22 and 24 also includes an upper, circular aperture 32 and 34 respectively spaced from the lower apertures 28 and 30 respectively. The adjustable lockable sliding member to be locked by the locking device 16 is the slidable bar 12 which is slidably mounted in the lower apertures 28 and 30.

A threaded spindle 36 is rotatably mounted in the circular apertures 32 and 34. The spindle 36 includes a large diameter portion 38 and a small diameter portion 40 having a central threaded section 42 for threaded engagement with the circular aperture 32 and a nut 43 secured to the leg 22 and co-axial with the aperture 32. The small diameter portion 40 also includes unthreaded end portions 44 and 46 while the large diameter portion also includes a knob 48 at its exterior end (see FIG. 1).

The locking device further includes a yoke 50 rotatably mounted on the unthreaded end portion 46 of the spindle 36. The yoke 50 includes a vertical face 51 (see FIG. 2) and a pair of camming posts 52 and 54 extending outwardly therefrom perpendicular to the axis of the spindle 36. A U-shaped cam follower member 56 is situated between the legs 22 and 24 of the U-shaped bracket 18. The cam follower member 56 includes a median section 58 (see FIGS. 2, 5 and 6) contiguous with the slidable bar 12 and a pair of flanges 60 and 62 extending upwardly from the median section 58. Each of the flanges 60 and 62 includes a camming surface 64 and 66 respectively inclined downwardly in the direction of the spindle knob 48 for camming engagement with the camming posts 52 and 54 respectively. Disengagement of the spindle 36 from the aperture 32 is prevented by a clinch nut 68 which is seated in a channel 70 at the end of the unthreaded end portion 44 of the small diameter portion 40 of the spindle 36.

In operation, adjustment and locking of the envelope guide 10 is achieved by rotating the knob 48 counterclockwise which causes the spindle 36 to move in the direction of the knob 48 which results in the camming posts 52 and 54 being moved from their compressive engagement with the camming surfaces 64 and 66 respectively (see FIG. 4), which in turn removes the pressure exerted by the median section 58 of the cam follower member 56 against the slidable bar 12 resting on the central section 20 of the bracket 18. Once the slidable bar 12 is freed of pressure, it can be moved in or out in accordance with the needs of the envelope guide 10 and set accordingly. The knob 48 is then rotated clockwise which moves the spindle 36 in a direction away from the knob 48, resulting in the large diameter portion 38 of the spindle 36 pushing against the vertical face 51 of the yoke 50 (see FIG. 3). The pressure exerted on the vertical face 51 is transmitted to the cam follower member 56 owing to the camming posts 52 and 54 being forced to engage the camming surfaces 64 and 66. Because the camming surfaces 64 and 66 are fixed in their positions and restrained from in and out movement by being sandwiched between the legs 22 and 24 of the bracket 18, movement of the camming posts 52 and 54 away from the knob 48 results in increased downward pressure on the camming surfaces 64 and 66 and hence on the cam follower member 56. Since the slidable bar 12 is supported by the central section 20 of the bracket 18, the increased pressure on the cam follower member 56 results in increased pressure on the slidable bar 12.

Once the knob 48 is rotated as far as it can go, the slidable bar 12 is locked in place against any kind of movement or vibration. This result is due to the large surface area of the central section of the bracket 18 and the median section 58 of the cam follower member 56 contacting both sides of the slidable bar 12.

The exemplary embodiments described herein are presently considered to be preferred; however, it is contemplated that further variations and modifications within the purview of those skilled in the art can be made herein. The following claims are intended to cover all such variations and modifications as fall within the true spirit and scope of the invention.

What is claimed is:

1. A device for locking a slidable member, comprising:
   a U-shaped bracket having a central section and a pair of legs extending upwardly from each end of the central section, each of said legs having a lower aperture adjacent the central section and an upper, circular aperture spaced from said lower aperture;
   a lockable sliding member slidably mounted in said lower apertures;
   a threaded spindle rotatably mounted in the circular apertures, said spindle having a large diameter portion and a small diameter portion, said small diameter portion having a central threaded section for threaded engagement with one of said circular apertures and unthreaded end portions, said large diameter portion having a knob at its exterior end;
   a yoke rotatably mounted on the unthreaded portion of said threaded spindle adjacent the large diameter portion, said yoke having a pair of camming posts extending outwardly therefrom perpendicular to the axis of said threaded spindle; and
   a U-shaped cam follower member situated between said legs of said U-shaped bracket, said cam follower member having a median section contiguous with said lockable, sliding member and a pair of flanges extending upwardly from said median section, each of said flanges having a camming surface inclined downwardly in the direction of said spindle knob for camming engagement with said camming posts, wherein rotation of said knob in one direction causes said camming posts to be moved in a direction away from said knob by engagement of said yoke with said large diameter portion to thereby create downward pressure on said cam follower member and said median section against said sliding member; and to lock said sliding member against said central section to prevent any movement therebetween.

2. The device of claim 1, wherein said yoke includes a vertical, flat surface for engagement with said large diameter portion of said threaded spindle.

3. The device of claim 2, wherein said lockable sliding member comprises an envelope guide for use with a mailing machine.

* * * * *